(12) United States Patent
Bhat et al.

(10) Patent No.: US 12,233,723 B2
(45) Date of Patent: Feb. 25, 2025

(54) CONTAINED PACKAGE FOR AUTOMOTIVE INVERTER AND Y-SNUBBER COMPONENTS

(71) Applicant: FORD GLOBAL TECHNOLOGIES, LLC, Dearborn, MI (US)

(72) Inventors: Krishna Prasad Bhat, Canton, MI (US); Chingchi Chen, Ann Arbor, MI (US); Nitin Parsa, Farmington Hills, MI (US); Varittha Sanphuang, Dearborn, MI (US); Michael W. Degner, Novi, MI (US); Hongjie Wu, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 128 days.

(21) Appl. No.: 18/153,044

(22) Filed: Jan. 11, 2023

(65) Prior Publication Data
US 2024/0227581 A1    Jul. 11, 2024

(51) Int. Cl.
*B60L 50/60*     (2019.01)
*H01M 10/42*    (2006.01)
*H02M 1/34*      (2007.01)
*H02M 7/537*    (2006.01)

(52) U.S. Cl.
CPC .......... *B60L 50/60* (2019.02); *H01M 10/425* (2013.01); *H02M 1/348* (2021.05); *H02M 7/537* (2013.01); *H01M 2220/20* (2013.01)

(58) Field of Classification Search
CPC ......... H02M 1/34; H02M 7/537; H01M 10/42
See application file for complete search history.

(56) References Cited

U.S. PATENT DOCUMENTS

| | | | |
|---|---|---|---|
| 5,436,540 A | 7/1995 | Kumar | |
| 6,166,500 A | 12/2000 | Makaran | |
| 6,331,365 B1 * | 12/2001 | King | B60L 50/51 |
| | | | 320/126 |
| 8,705,257 B2 | 4/2014 | Yamaguchi et al. | |
| 9,184,701 B2 | 11/2015 | Berchtold et al. | |
| 2007/0170910 A1 | 7/2007 | Chang et al. | |
| 2012/0051094 A1 * | 3/2012 | George | H02M 3/3376 |
| | | | 180/65.21 |
| 2012/0106220 A1 * | 5/2012 | Yamaguchi | H05K 7/209 |
| | | | 363/131 |
| 2018/0367025 A1 * | 12/2018 | Rasek | H02M 1/126 |
| 2023/0216291 A1 * | 7/2023 | Sim | H03K 17/567 |
| | | | 361/42 |
| 2023/0344358 A1 * | 10/2023 | Rmila | H02M 3/33569 |

FOREIGN PATENT DOCUMENTS

JP      2004159485 A    6/2004

* cited by examiner

*Primary Examiner* — Alfonso Perez Borroto
*Assistant Examiner* — Esayas G Yeshaw
(74) *Attorney, Agent, or Firm* — David B. Kelley; Brooks Kushman P.C.

(57) ABSTRACT

An automotive power system includes a traction battery, an electric machine, and one or more power cards each containing at least one power semiconductor switch and at least one Y-snubber that includes a series connected capacitor and resistor. The power semiconductor switches are arranged to form an inverter electrically connected between the traction battery and electric machine. The resistors are tuned to dissipate common mode noise associated with operation of the power semiconductor switches.

19 Claims, 6 Drawing Sheets

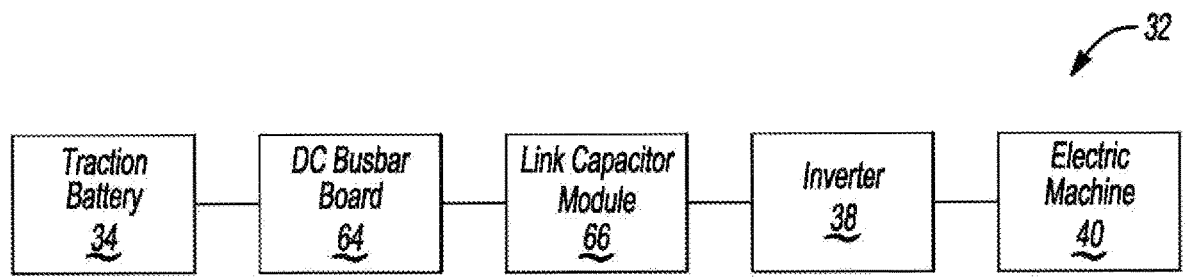
_Fig-3_
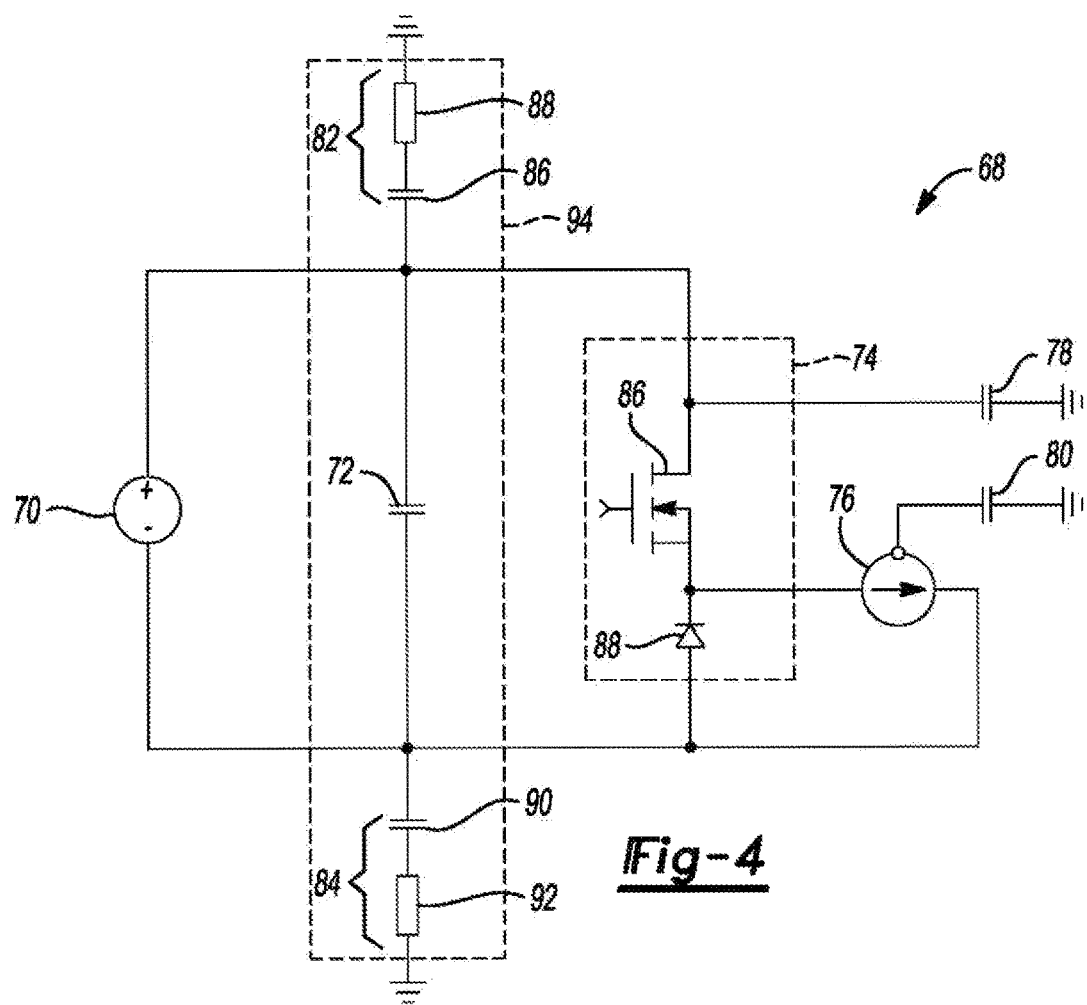
_Fig-4_

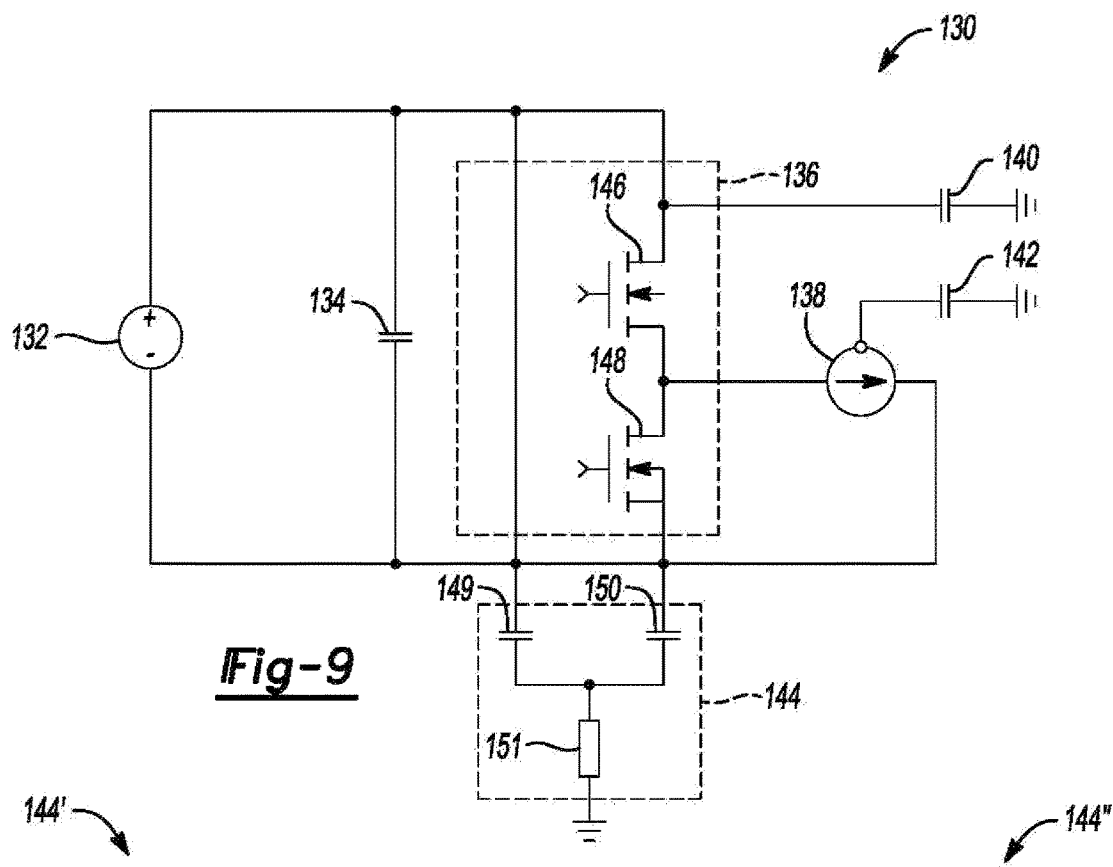
Fig-9
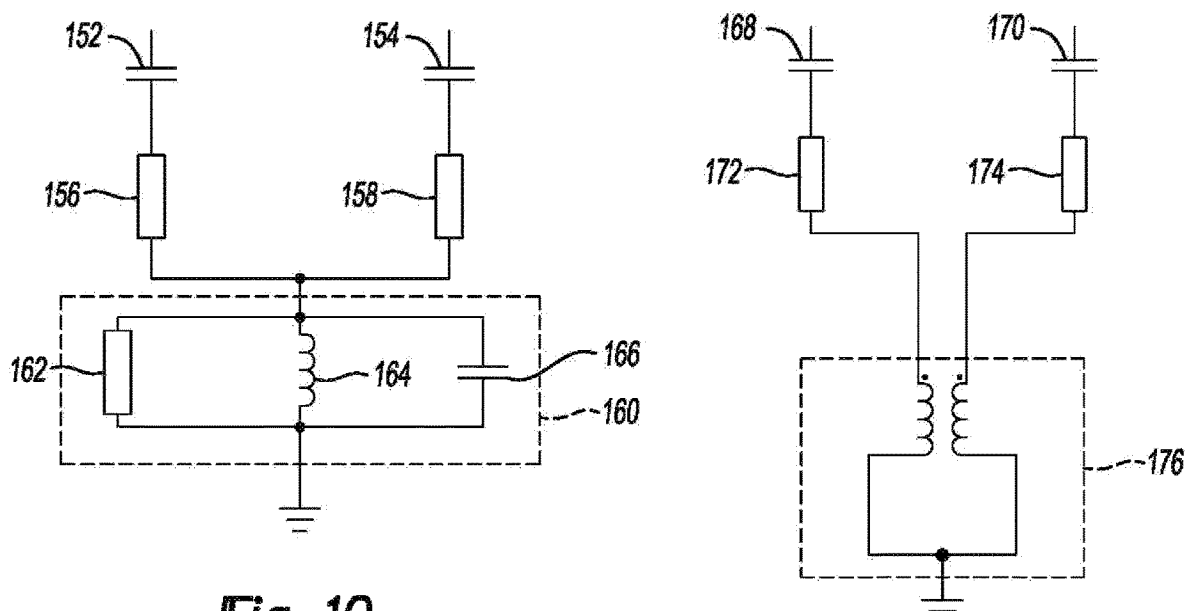
Fig-10
Fig-11

US 12,233,723 B2

CONTAINED PACKAGE FOR AUTOMOTIVE INVERTER AND Y-SNUBBER COMPONENTS

TECHNICAL FIELD

This disclosure relates to automotive power systems.

BACKGROUND

Certain vehicles may be powered by an electric machine that converts electrical energy to mechanical energy. This electrical energy may be stored in a battery and provided to the electric machine as needed. Various components may be used to condition the electrical energy before it is provided to the electric machine.

SUMMARY

An automotive power system includes a traction battery, an electric machine, and one or more power cards. Each of the one or more power cards contains at least one power semiconductor switch and at least one Y-snubber that includes a series connected capacitor and resistor, wherein the power semiconductor switches are arranged to form an inverter electrically connected between the traction battery and electric machine and wherein the resistors are tuned to dissipate common mode noise associated with operation of the power semiconductor switches.

Each of the one or more power cards may include a pair of series connected power semiconductor switches and each of the at least one Y-snubbers may include a pair of resistors. Only one of the pair of resistors may be series connected with the pair of series connected power semiconductor switches. Each of the one or more power cards may include a pair of series connected power semiconductor switches and each of the at least one Y-snubbers may include a single resistor. Each of the one or more power cards may further contain a choke electrically connected with the at least one Y-snubber. The one or more power cards may be arranged to form an integrated unit, and the integrated unit may contain a choke electrically connected with at least one of the Y-snubbers. Each of the one or more power cards may further contain a multi-turn filter choke electrically connected with the at least one Y-snubber. The one or more power cards may be arranged to form an integrated unit, and the integrated unit may contain a multi-turn filter choke electrically connected with at least one of the Y-snubbers.

An automotive power system includes a traction battery, an electric machine, and one or more power cards. The one or more power cards are arranged to form an integrated unit. Each of the one or more power cards contains at least one power semiconductor switch. The power semiconductor switches are arranged to form an inverter electrically connected between the traction battery and electric machine. The integrated unit contains at least one Y-snubber electrically connected to at least one of the power semiconductor switches and including a series connected capacitor and resistor.

Each of the one or more power cards may include a pair of series connected power semiconductor switches. The at least one Y-snubber may include a single resistor. The integrated unit may further contain at least one choke electrically connected with at least one of the Y-snubbers. The integrated unit may further contain at least one multi-turn filter choke electrically connected with the at least one Y-snubbers.

A power module includes an inverter having a plurality of power semiconductor switches and a plurality of series connected pairs of capacitors and resistors that are electrically connected between a rail of the inverter and ground, wherein the power semiconductor switches and series connected pairs of capacitors and resistors are contained within one or more power cards.

Each of the one or more power cards may include a pair of the power semiconductor switches connected in series. Each of the one or more power cards may further contain a choke. The power module may further contain a choke. Each of the one or more power cards may further contain a multi-turn filter choke. The power module may further contain a multi-turn filter choke.

BRIEF DESCRIPTION OF THE DRAWINGS

FIG. 3 is a block diagram of the automotive power system of FIG. 2.

FIG. 4 is a schematic diagram of an automotive power system.

FIG. 9 is a schematic diagram of an automotive power system.

FIG. 10 is a schematic diagram of a Y-snubber.

FIG. 11 is a schematic diagram of a Y-snubber.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In a traction inverter, operation of power semiconductors causes change in voltage with respect to time (dv/dt) excitation and change in current with respect to time (di/dt) excitation. This may cause associated parasitic capacitances and inductances in the system to oscillate at specific frequencies. The oscillations can be characterized as common mode and differential mode noise. This electromagnetic interference noise (predominantly common mode noise) propagates to other subsystems through the A/C and D/C terminals of the traction inverter, potentially causing interference or vehicle level radiated emissions.

To reduce the amount of common mode noise propagating to other subsystems, traction inverters often use Y-capacitors or common mode capacitors to provide a low impedance path back to the noise source. (An element connected between a floating bus and ground is a Y-connected element.) This arrangement has practical limitations and may not fully resolve the electromagnetic interference noise propagation. Further, with the introduction of wide band gap semiconductors (e.g., silicon carbide and gallium nitride metal-oxide-semiconductor field-effect transistors), system excitation is further increased.

Figure 1:
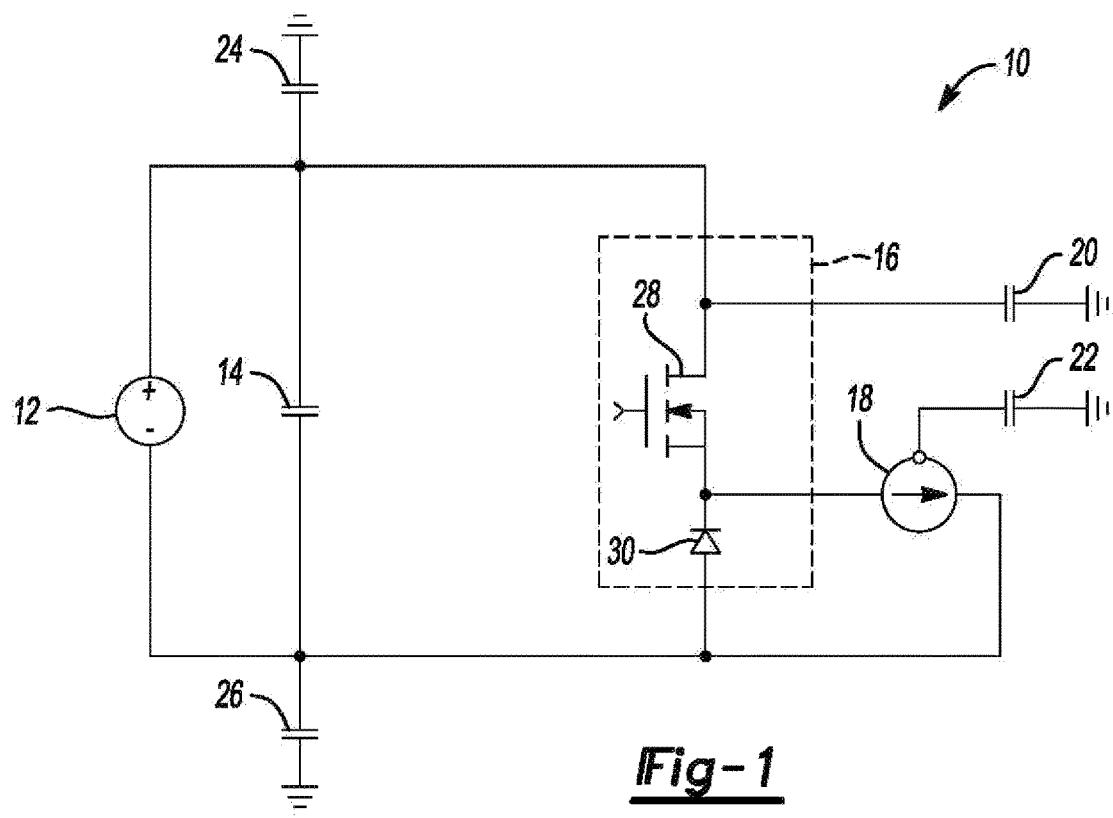
FIG. 1 is a schematic diagram of an automotive power system.

Referring to FIG. 1, an automotive power system 10 includes a traction battery 12, a link capacitor 14, an inverter 16, a motor 18, parasitic capacitances 20, 22, and Y-capacitors 24, 26. The automotive power system 10 (and the other automotive power systems illustrated herein) of course include other parasitic inductances and resistances, but these are not illustrated in the interest of clarity. The link capacitor 14 is in parallel with the traction battery 12, and electrically between the traction battery 12 and inverter 16. While the inverter 16 is a three-phase inverter, only a single phase is shown in the interest of clarity. This phase is represented with field effect transistor 28 and diode 30 connected in series. Moreover, the inverter 16 is electrically between the link capacitor 14 and motor 18. Practical implementation of the Y-capacitors 24, 26 introduces in-series parasitic inductances. This can reduce effectiveness of the Y-capacitors 24, 26. And the parasitic capacitances 20, 22 serve as coupling paths for common mode noise.

Y-snubbers or common mode resistor-capacitor snubbers can be used for performance reasons. The resistor component can be tuned as known in the art to dissipate the common mode noise (e.g., tens of milliwatts) in the form of heat. The ability of the snubber to dissipate energy reduces the amount of noise propagating to other sub-systems.

Figure 2:
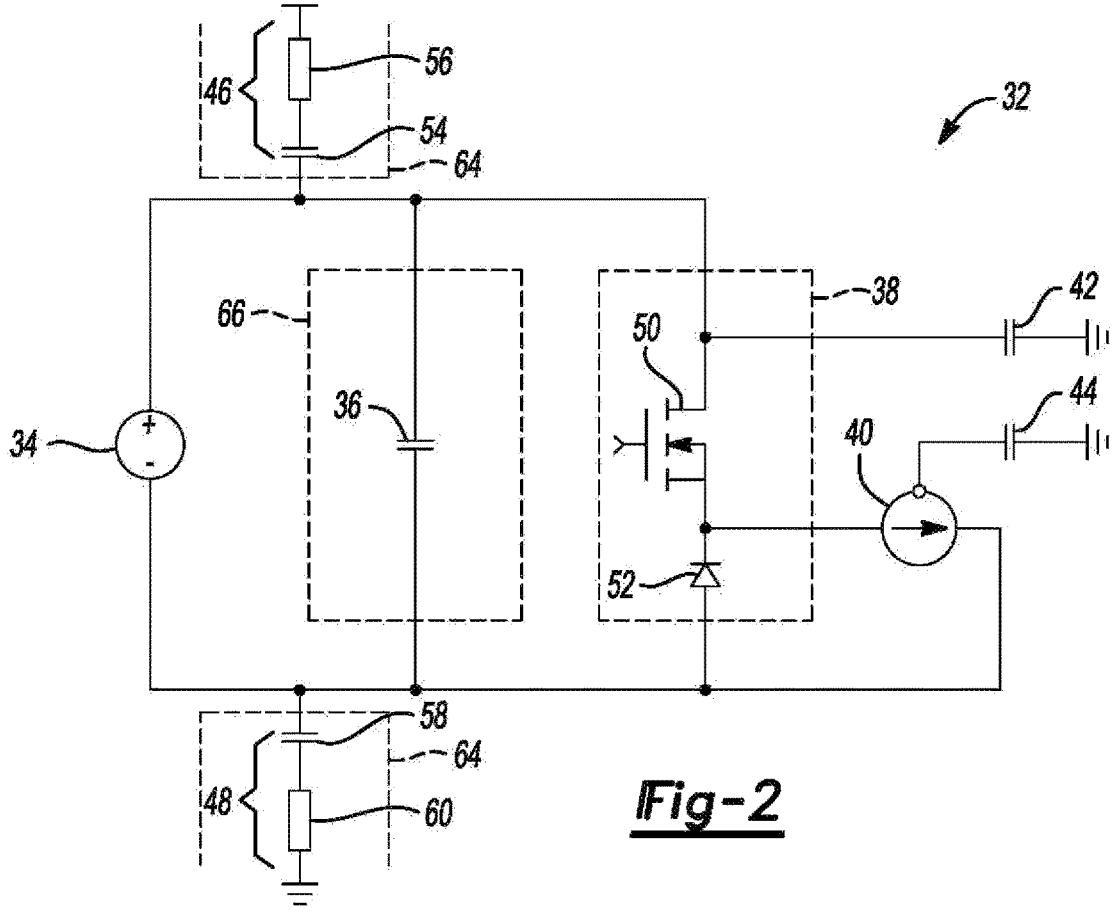
FIG. 2 is a schematic diagram of an automotive power system.

Referring to FIG. 2, an automotive power system 32 includes a traction battery 34, a link capacitor 36, an inverter 38, a motor 40, parasitic capacitances 42, 44, and Y-snubbers 46, 48. The link capacitor 36 is in parallel with the traction battery 34, and electrically between the traction battery 34 and inverter 38. Again, only a single phase of the inverter 38 is shown in the interest of clarity. This phase is represented with field effect transistor 50 and diode 52 connected in series. Moreover, the inverter 38 is electrically between the link capacitor 36 and motor 40.

The Y-snubbers 46, 48 are each electrically connected between a floating bus of the power system 32 and ground. The Y-snubber 46 includes a series connected capacitor 54 and resistor 56, with the capacitor 54 being electrically connected between the floating bus and resistor 56. The Y-snubber 48 includes a series connected capacitor 58 and resistor 60, with the capacitor 58 being electrically connected between the floating bus and resistor 60.

Such arrangements are typically implemented as a stand-alone setup DC connector of inverters, with the components of the snubber placed on a printed circuit board and connected to the DC bus of the inverter. Referring to FIGS. 2 and 3, the automotive power system 32 further includes a DC busbar board 64 and link capacitor module 66. The DC busbar board 64 physically contains the Y-snubbers 44, 46 and the link capacitor module 66 physically contains the link capacitor 36. That is, the traction battery 34, DC busbar board 64, link capacitor module 66, inverter 38, and electric machine 40 are physically distinct elements that are separate from each other, but electrically connected.

Referring to FIG. 4, an automotive power system 68 includes a traction battery 70, a link capacitor 72, an inverter 74, a motor 76, parasitic capacitances 78, 80, and Y-snubbers 82, 84. The link capacitor 72 is in parallel with the traction battery 70, and electrically between the traction battery 70 and inverter 74. Again, only a single phase of the inverter 74 is shown in the interest of clarity. This phase is represented with field effect transistor 86 and diode 88 connected in series. Moreover, the inverter 74 is electrically between the link capacitor 72 and motor 76.

The Y-snubbers 82, 84 are each electrically connected between a floating bus of the power system 68 and ground. The Y-snubber 82 includes a series connected capacitor 86 and resistor 88, with the capacitor 86 being electrically connected between the floating bus and resistor 88. The Y-snubber 84 includes a series connected capacitor 90 and resistor 92, with the capacitor 90 being electrically connected between the floating bus and resistor 92.

Figure 5:
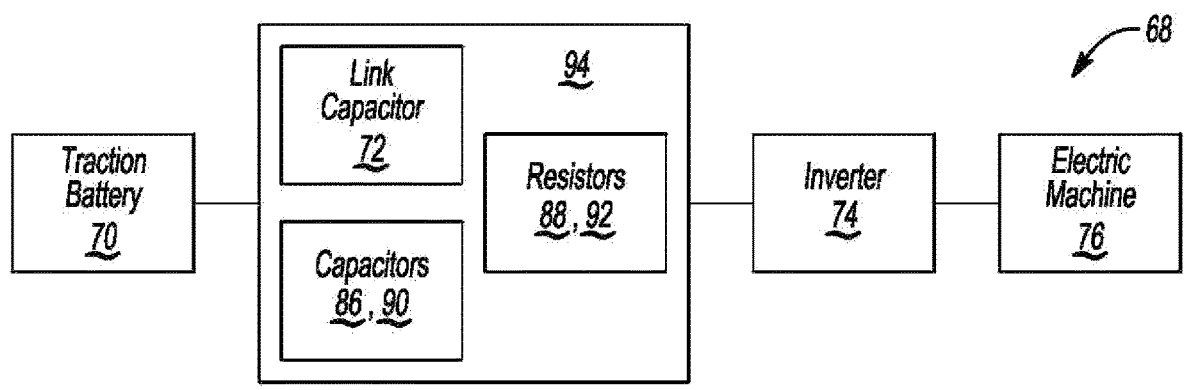
FIG. 5 is a block diagram of the automotive power system of FIG. 4.

Here, the Y-snubbers 82, 84 are implemented within a physical package that includes the link capacitor 72. Referring to FIGS. 4 and 5, the automotive power system 68 further includes capacitive-resistive module 94. In this example, the capacitive-resistive module 94 implements the link capacitor 72, capacitors 86, 90, and resistors 88, 92 as films on a same substrate that are connected with copper bus bars, molded in epoxy to provide mechanical rigidity, and encased in a same housing. That is, the traction battery 70, resistive-capacitive module 94, inverter 74, and electric machine 76 are physically distinct elements that are separate from each other, but electrically connected.

Figure 6:
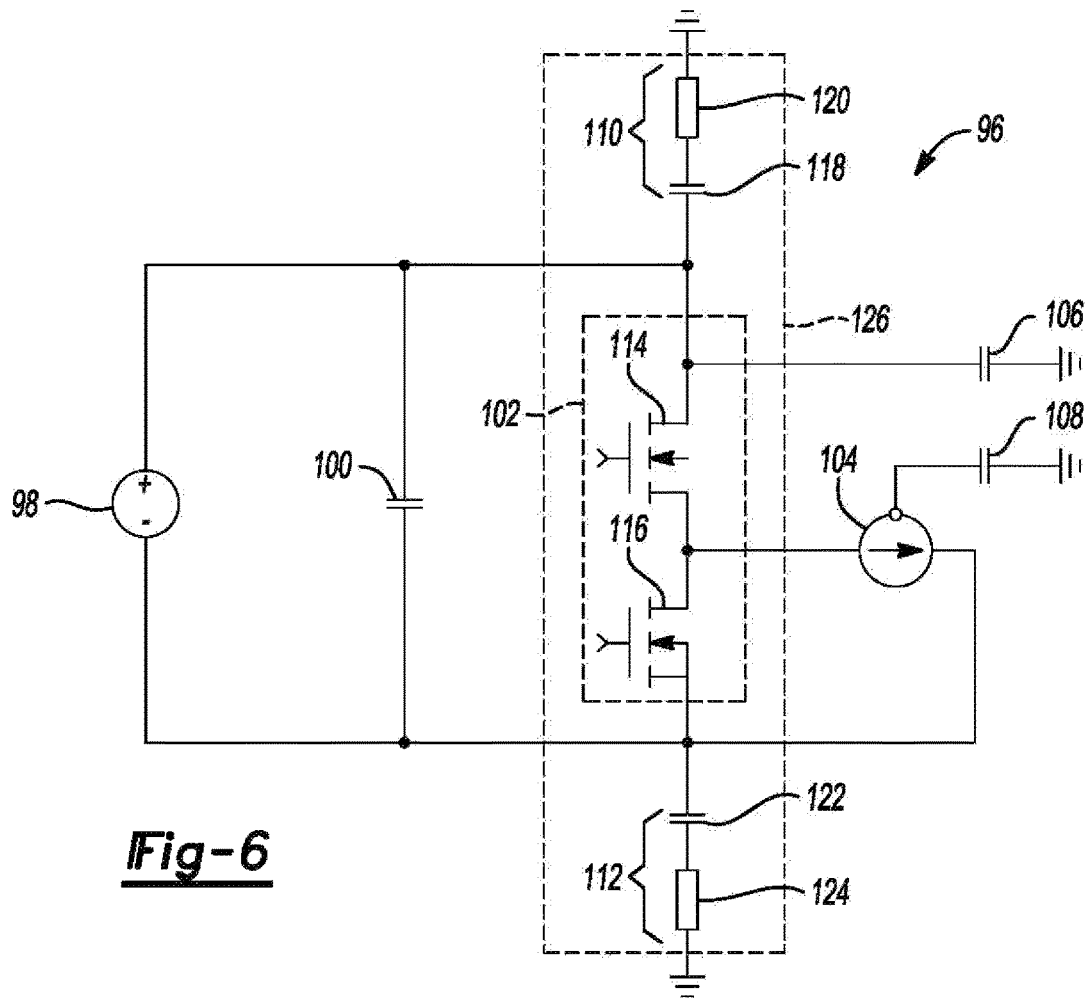
FIG. 6 is a schematic diagram of an automotive power system.

Referring to FIG. 6, an automotive power system 96 includes a traction battery 98, a link capacitor 100, an inverter 102, a motor 104, parasitic capacitances 106, 108, and Y-snubbers 110, 112. The link capacitor 100 is in parallel with the traction battery 98, and electrically between the traction battery 98 and inverter 102. Again, only a single phase of the inverter 102 is shown in the interest of clarity. This phase is represented with field effect transistors 114, 116 connected in series. Moreover, the inverter 102 is electrically between the link capacitor 100 and motor 104.

The Y-snubbers 110, 112 are each electrically connected between a floating bus of the power system 96 and ground. The Y-snubber 110 includes a series connected capacitor 118 and resistor 120, with the capacitor 118 being electrically connected between the floating bus and resistor 120. The Y-snubber 112 includes a series connected capacitor 122 and resistor 124, with the capacitor 122 being electrically connected between the floating bus and resistor 124.

Figure 7:
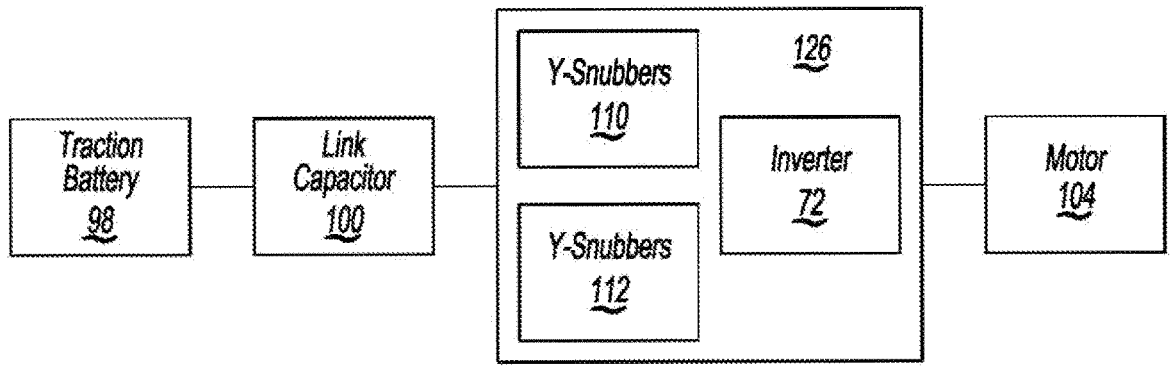
FIG. 7 is a block diagram of the automotive power system of FIG. 6.

Here, the Y-snubbers 110, 112 are implemented within the physical package of a power module 126. Referring to FIGS. 6 and 7, the power module 126 includes a single nit having elements of the snubbers 110, 112 and inverter 102 mounted on a common substrate, molded in epoxy, and encased in a same housing. That is, the traction battery 98, link capacitor 100, power module 126, and electric machine 104 are physically distinct elements that are separate from each other, but electrically connected.

Figure 8:
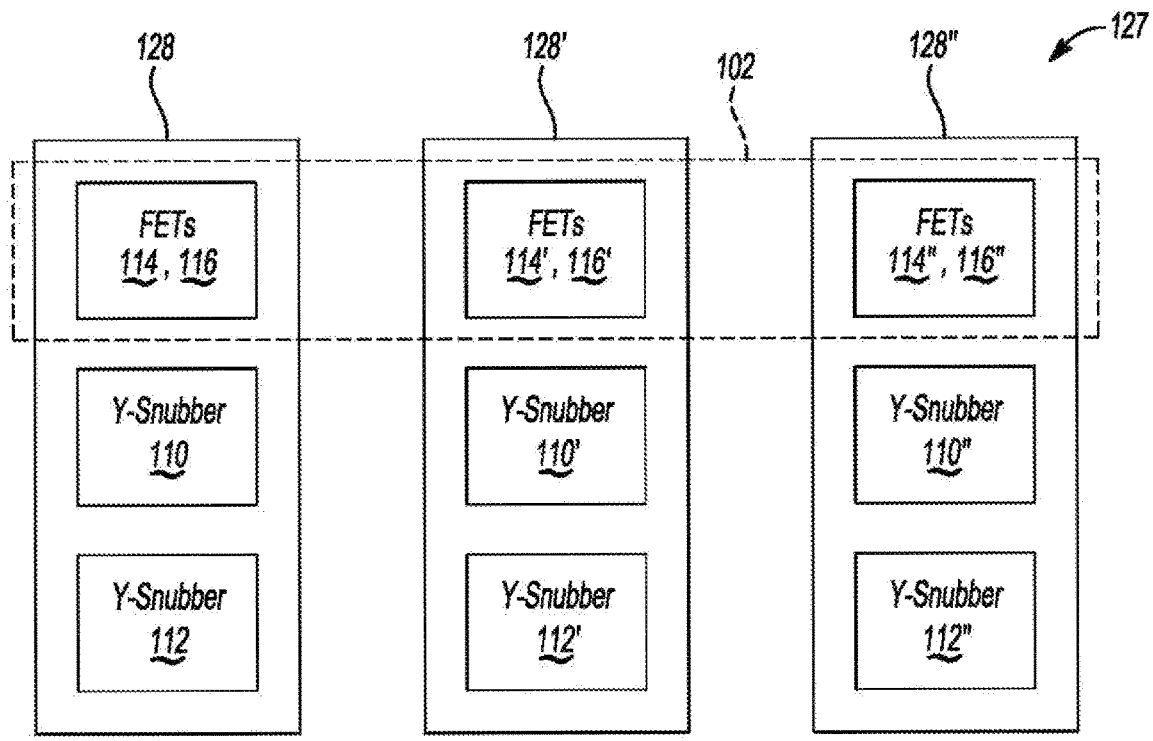
FIG. 8 is a block diagram of a power module.

Referring to FIG. 8, an alternatively constructed power module 127 is shown with three phases. The phase defined by the field effect transistors 114, 116 is connected with Y-Snubbers 110, 112. The phase defined by field effect transistors 114', 116' is connected with Y-Snubbers 110', 112'. And, the phase defined by field effect transistors 114", 116" is connected with Y-Snubbers 110", 112". The field effect transistors 114, 116 and Y-Snubbers 110, 112 are mounted on a substrate 128, forming a power card. The field effect transistors 114', 116' and Y-Snubbers 110', 112' are mounted on a substrate 128', forming a power card. And, the field effect transistors 114", 116" and Y-Snubbers 110", 112" are mounted on a substrate 128", forming a power card. That is, the alternatively constructed power module 127 has a power card for each phase. These power cards can, for example, be molded in epoxy or the like to contribute to structural rigidity and be contained with a common housing, resulting in an integrated unit.

Referring to FIG. 9, an automotive power system 130 includes a traction battery 132, a link capacitor 134, an inverter 136, a motor 138, parasitic capacitances 140, 142, and Y-snubber 144. The link capacitor 134 is in parallel with the traction battery 132, and electrically between the traction battery 132 and inverter 136. Again, only a single phase of the inverter 136 is shown in the interest of clarity. This phase is represented with field effect transistors 146, 148 connected in series. Moreover, the inverter 136 is electrically between the link capacitor 134 and motor 138.

The Y-snubber 144 is electrically connected between a floating bus of the power system 130 and ground. The Y-snubber 144 includes a pair of capacitors 149, 150 and a single resistor 151, with the capacitors 149, 150 being electrically connected between the floating bus and resistor 151. That is, the capacitors 149, 150 share a common resistor (e.g., the resistor 151). The inverter 136 and Y-snubber 144 may be implemented as a single power card, or across several power cards as described above. The inverter 136 and capacitors 149, 150, for example, may be mounted on a single or several substrates, with the resistor 151 being mounted separately, but yet still part of the same power module. Other arrangements are also possible.

Referring to FIG. 10, a Y-snubber 144' may include a pair of capacitors 152, 154, a pair of resistors 156, 158, and a choke 160 (e.g., a multi-turn filter choke). The capacitor 152 and resistor 156 are connected in series and the capacitor 154 and resistor 158 are connected in series. The choke 160 is electrically connected between the resistors 156, 158 and ground, and includes a resistor 162, inductor 164, and capacitor 166 connected in parallel. The Y-snubber 144' and any associated inverter may be implemented as a single power card, or across several power cards as described above. Moreover, the choke 160 may be implemented separately from the power cards, but part of a same integrated unit within a common housing.

Referring to FIG. 11, a Y-snubber 144" may include a pair of capacitors 168, 170, a pair of resistors 172, 174, and a filter core 176. The capacitor 168 and resistor 172 are connected in series and the capacitor 170 and resistor 174 are connected in series. The filter core 176 is electrically connected between the resistors 172, 174 and ground. The Y-snubber 144" and any associated inverter may be implemented as a single power card, or across several power cards as described above.

Figure 12:
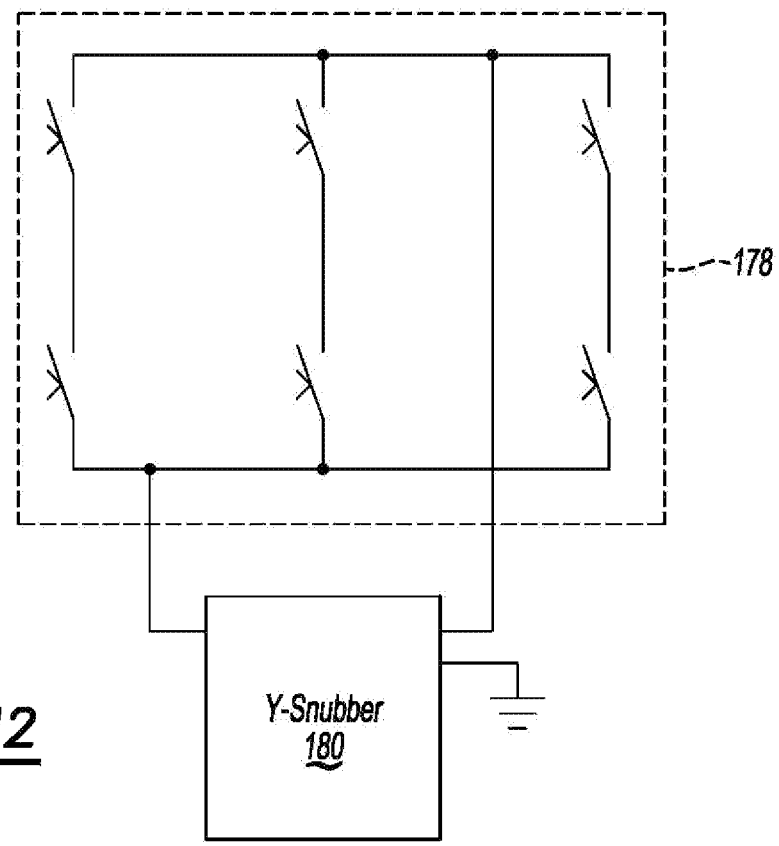
FIG. 12 is a schematic diagram of an automotive power system.

Referring to FIG. 12, an inverter 178 may have a single Y-snubber 180 connected therewith. These components may be implemented and packaged as contemplated herein.

Figure 13:
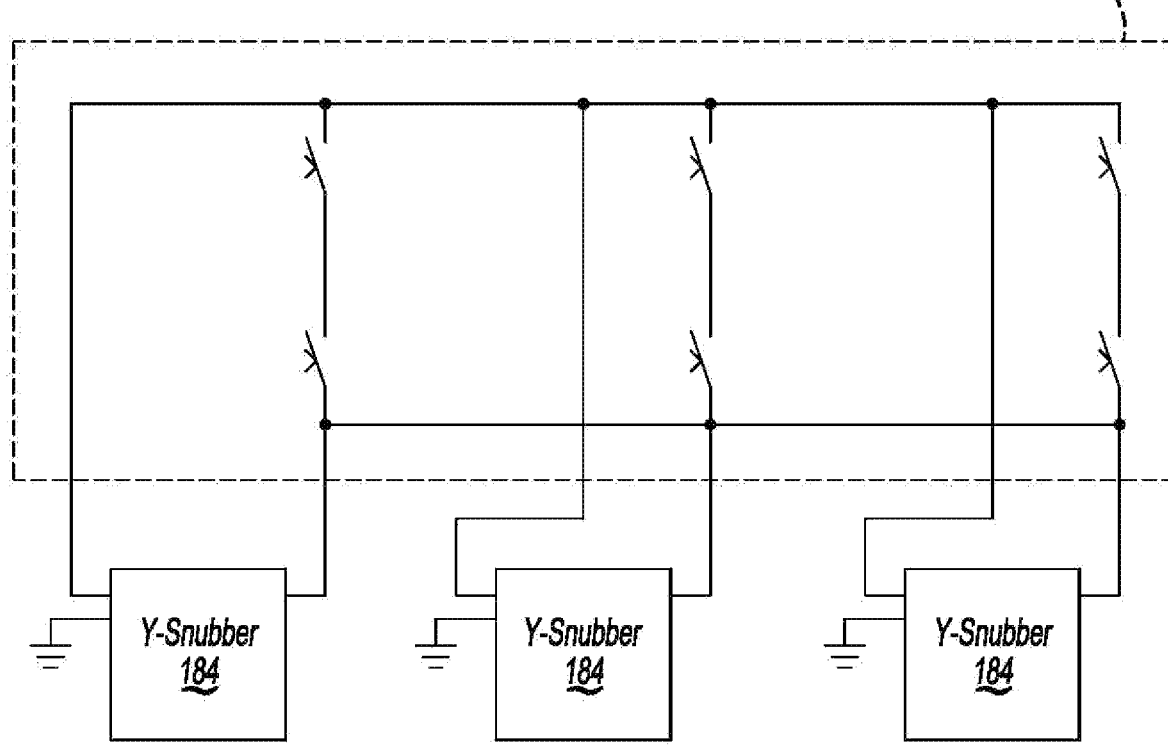
FIG. 13 is a schematic diagram of an automotive power system.

Referring to FIG. 13, each phase of an inverter 182 may have its own Y-snubber 184 connected therewith. These components may be implemented and packaged as contemplated herein.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive power system comprising:
   a traction battery;
   an electric machine; and
   one or more power cards each containing at least one power semiconductor switch and at least one Y-snubber that includes a series connected capacitor and resistor, wherein the power semiconductor switches are arranged to form an inverter electrically connected between the traction battery and electric machine and wherein the resistors are tuned to dissipate common mode noise associated with operation of the power semiconductor switches.

2. The automotive power system of claim 1, wherein each of the one or more power cards includes a pair of series connected power semiconductor switches and each of the at least one Y-snubbers includes a pair of resistors.

3. The automotive power system of claim 2, wherein only one of the pair of resistors is series connected with the pair of series connected power semiconductor switches.

4. The automotive power system of claim 1, wherein each of the one or more power cards includes a pair of series connected power semiconductor switches and each of the at least one Y-snubbers includes a single resistor.

5. The automotive power system of claim 1, wherein each of the one or more power cards further contains a choke electrically connected with the at least one Y-snubber.

6. The automotive power system of claim 1, wherein the one or more power cards are arranged to form an integrated unit, and wherein the integrated unit contains a choke electrically connected with at least one of the Y-snubbers.

7. The automotive power system of claim 1, wherein each of the one or more power cards further contains a multi-turn filter choke electrically connected with the at least one Y-snubber.

8. The automotive power system of claim 1, wherein the one or more power cards are arranged to form an integrated unit, and wherein the integrated unit contains a multi-turn filter choke electrically connected with at least one of the Y-snubbers.

9. An automotive power system comprising:
   a traction battery;
   an electric machine; and
   one or more power cards arranged to form an integrated unit and each containing at least one power semiconductor switch, wherein the power semiconductor switches are arranged to form an inverter electrically connected between the traction battery and electric machine, wherein the integrated unit contains at least one Y-snubber electrically connected to at least one of the power semiconductor switches and including a series connected capacitor and resistor.

10. The automotive power system of claim 9, wherein each of the one or more power cards includes a pair of series connected power semiconductor switches.

11. The automotive power system of claim 9, wherein the at least one Y-snubber includes a single resistor.

12. The automotive power system of claim 9, wherein the integrated unit further contains at least one choke electrically connected with at least one of the Y-snubbers.

13. The automotive power system of claim 9, wherein the integrated unit further contains at least one multi-turn filter choke electrically connected with the at least one Y-snubbers.

14. A power module comprising:
an inverter including a plurality of power semiconductor switches and a plurality of series connected pairs of capacitors and resistors that are electrically connected between a rail of the inverter and ground, wherein the power semiconductor switches and series connected pairs of capacitors and resistors are contained within one or more power cards.

15. The power module of claim 14, wherein each of the one or more power cards includes a pair of the power semiconductor switches connected in series.

16. The power module of claim 14, wherein each of the one or more power cards further contains a choke.

17. The power module of claim 14 further containing a choke.

18. The power module of claim 14, wherein each of the one or more power cards further contains a multi-turn filter choke.

19. The power module of claim 14 further containing a multi-turn filter choke.

* * * * *